United States Patent [19]

Grunwald

[11] Patent Number: 5,170,840
[45] Date of Patent: Dec. 15, 1992

[54] METHOD FOR DETECTING BREACHES IN HEAT EXCHANGER TUBING

[76] Inventor: James L. Grunwald, 520 Young Dr., Owatonna, Minn. 55060

[21] Appl. No.: 898,694

[22] Filed: Jun. 15, 1992

[51] Int. Cl.$^5$ ............................................. F28F 11/00
[52] U.S. Cl. ........................................ 165/1; 165/11.1; 165/95; 73/40; 73/40.5 R; 134/2; 134/3; 134/28
[58] Field of Search ................ 165/1, 95, 11.1; 134/2, 134/3, 28; 73/40, 40.5 R

[56] References Cited

U.S. PATENT DOCUMENTS

| | | | |
|---|---|---|---|
| 3,572,085 | 3/1971 | Padko | 73/40.5 R |
| 3,996,062 | 12/1976 | Frost et al. | 134/3 |
| 4,162,229 | 7/1979 | Loewenschuss | 134/2 |
| 4,243,547 | 1/1981 | Molina | 73/40.5 R |
| 4,476,047 | 10/1984 | Bonnici et al. | 134/2 |
| 4,666,528 | 5/1987 | Arrington et al. | 134/2 |
| 4,756,768 | 7/1988 | Bertholdt et al. | 134/3 |
| 4,758,366 | 7/1988 | Parekh | 73/40 |

FOREIGN PATENT DOCUMENTS 0807099  2/1981  U.S.S.R. ................... 73/40

*Primary Examiner*—John K. Ford
*Attorney, Agent, or Firm*—George R. Nimmer

[57] ABSTRACT

The inner-surfaces of heat exchanger tubing is cleansed with a sulfamic acid aqueous mixture and then subjected to a purplish-colored aqueous solution of potassium permangenate adapted to seep through to and become visually discernible at the heat exchanger tubing outer-surface to thusly visually indicate breach-faulted heat exchanger tubing. Any thusly inspected non-breach heat exchanger is purged with an oxalic acid aqueous solution and retained as acceptable for future re-use. The breach detecting method is generally applicable to all heat exchangers of the heat-conductive metallic tubing type, and, inter alia, specificaly applicable to dairy plate heat exchangers having metallic tubings.

6 Claims, No Drawings

METHOD FOR DETECTING BREACHES IN HEAT EXCHANGER TUBING

BACKGROUND OF THE INVENTION

Workers in the herein related prior art understand the term "metallic 'tubing' type heat exchanger" to mean:
(a) the heat exchanger includes elongate heat-conductive metallic "tubing" having two open-end terminii. Extending between the open-end terminii, a visually-hidden inner-surface surrounded by an outer-surface. Such "tubing" can take numerous forms (e.g. regular-size tubes, confronting contoured plates, etc.); and wherein
(b) it is intended (and inherently possible) that an inner-fluid and an outer-fluid, simultaneously flowing along the heat-conductive metallic "tubing" inner-surface and outer-surface, respectively, will have their temperatures conductively modified by each other.

Normal metallic fatigue eventually results in pinholes, cracks, or other breach of the heat exchanger's elongate heat-conductive metallic "tubing", whereby inter-fluids seepage results between the inner-fluid and outer-fluid. If it is essential that one (or both) of the two flowable fluids be strictly maintained free of inter-fluids contamination (e.g. milk or other foodstuff inner-fluid, and steam or coolant outer-fluid), such inter-fluids seepage is intolerable. Thus, the heat exchanger's elongate metallic heat-conductive "tubing" must be regularly periodically inspected to detect the possible emergence of structural breach between the "tubing" inner-surface and outer-surface.

OBJECT OF THE INVENTION

It is accordingly the general objective of the present invention to provide a reliable, convenient, and economical method for regularly inspecting heat exchangers of the elongate heat-conductive metallic tubing type (including, inter alia, milk treatment heat exchangers) to detect the existence of metallic tubing breach(es) between the inner-surface and outer-surface thereof.

GENERAL STATEMENT OF THE INVENTION

With the above general objective in view, and together with other related, ancillary and specific objectives which will become more apparent as this description proceeds, the novel method for inspectably detecting the existence of breach(es) between the inner-surface and outer-surface of a heat exchanger's heat-conductive metallic tubing, comprises the following sequential method steps:

(A) from one open-end and eventually out the other open-end thereof, flushing the heat exchanger elongate metallic tubing inner-surface with a sulfamic acid acqueous solution, and then draining said acqueous solution from the elongate metallic tubing. The sulfamic acid acqueous solution represents a range of 3% to 7% (and preferably 5%) sulfamic acid by weight in water. Preferably, said sulfamic acid acqueous solution is within the temperature range of about 140° to 150° Fahrenheit (and desireably about 145° F. The tubing outer-surface may be cleaned: mechanically; by said same sulfamic acid solution, or similar means;

(B) from one open-end and eventually out the other open-end thereof (and throughout a period of about one-half hour), introducing a purplish-colored admixture of potassium permangenate and water along the metallic tubing inner-surface, and visually inspecting the tubing outer-surface for any seepage of said purplish-colored admixture between tubing inner-surface and outer-surface. The purplish-colored admixture represents 0.5% to 2.0% alkaline (e.g. sodium hydroxide) and 0.5% to 2.0% potassium permangenate (preferably in substantially equal ratios) in acqueous medium. A 1% concentration of each is especially desireable. Preferably, said purplish-colored admixture has a temperature in the range of 170° to 190° F. (and desireably about 180° F.);

(C) in the event that purplish-colored admixture seepage is visually discernible at the tubing outer-surface (and thereby indicates inimical breach(s)): rejecting the heat exchanger so that it can be repaired or destroyed;

(D) in the event that no purplish-colored admixture seepage is visually discernible at the tubing outer-surface (and thereby indicates no tubing breach: Throughout a period of about ¼-hour, flushing the tubing inner-surface with an oxalic acid acqueous solution to purge the tubing inner-surface of said purplish-colored admixture, and accepting the heat exchanger for continued use. A preferable oxalic acid acqueous solution is in the range of 0.5% to 2.0% by weight (and desireably in substantially equal 1% amounts with a phosphoric acid buffer therefor). Preferably, said oxalic acid acqueous solution has a temperature in the range of 130° F. to 150° F. (and desireably 140° F.).

Though the sequence of inspection method steps hereabove described is generally applicable to heat exchangers comprising at least one elongate heat-conductive tube or tubing system therealong, it is also specifically applicable to diary plate heat exchangers for pasteurizing milk such as those, inter alia, currently being marketed by Alfa-Laval, Inc., currently located at 2115 Linwood Avenue, Fort Lee, N. J. 07024 (United States of America).

From the foregoing, the usage of the method for inspectably detecting breach between the inner-surface and outer-surface of metallic tubing for heat exchangers will be readily understood and further explanation is believed to be unnecessary. However, since numerous modifications and changes will readily occur to those skilled in the heat exchanger art, it is not desired to limit the invention method steps to those specifically shown and described, and accordingly, all suitable modifications and equivalents may be resorted to, falling within the scope of the appended claims.

I claim:

1. For a heat-exchanger comprising an elongate heat-conductive metallic heat exchanging pathway having two open-ends, a visually-hidden inner-surface extending between said two open-ends, and a visually-exposed outer-surface extending between said two open-ends, a method for detecting pinholes, cracks, and similar inimical breaches between the inner-surface and outer-surface of the said elongate heat-conductive metallic heat exchanging pathway, said detection method comprising the following steps:

(A) from one said open-end and out the other open-end, flushing the metallic heat exchanging pathway inner-surface with a sulfamic acid acqueous solution, and then draining said acqueous solution from the metallic heat exchanging pathway;

(B) from one said open-end and out the other open-end, introducing a purplish-colored admixture of caustic soda, potassium permangenate and water along the metallic heat exchanging pathway inner-surface, and visually inspecting the heat exchanging pathway outer-surface for any seepage of said purplish-colored admixture from heat exchanging pathway inner-surface to outer-surface;

(C) in the event that during step (B), any purplish-colored admixture seepage is visually discernible at the heat exchanging pathway outer-surface (and thereby indicates inimical breach between the heat exchanging pathway inner-surface and outer-surface): rejecting the heat-exchanger; and (D) in the event that during step (B), no purplish-colored admixture seepage is visually discernable at the heat exchanging pathway outer-surface (and thereby indicates no inimical breach): flushing the metallic heat exchanging pathway inner-surface with an admixture of oxalic acid, phosphoric acid, and water to purge the metallic heat exchanging pathway of said purplish-colored admixture; and accepting the heat exchanger for continued use.

2. The method of claim 1 wherein the sulfamic acid acqueous solution represents a range of 3% to 7% sulfamic acid by weight in water, and has a temperature within the range of 140° F. to 150° F.

3. The method of claim 1 wherein the purplish-colored admixture represents about 1% by weight potassium permangenate and about 1% by weight sodium hydroxide in water.

4. The method of claim 3 wherein the sulfamic acid acqueous solution represents a range of 3% to 7% sulfamic acid by weight in water; and wherein the purplish-colored admixture represents about 0.5% to 2.0% by weight potassium permangenate and about 0.5% to 2.0% by weight sodium hydroxide (and at substantially equal proportions) in water, and has a temperature of about 180° F.

5. The method of claim 1 wherein the oxalic acid acqueous solution represents a range of about 0.5% to 2.0% oxalic acid in water, and has a temperature of about 140° F.

6. The method of claim 4 wherein the oxalic acid admixture represents about 1% oxalic acid and about 1% phosphoric acid buffer, in water.

* * * * *